United States Patent [19]

Barclay

[11] 4,420,464
[45] Dec. 13, 1983

[54] RECOVERY OF VANADIUM FROM CARBONACEOUS MATERIALS

[75] Inventor: Kenneth M. Barclay, Woodland Hills, Calif.

[73] Assignee: Rockwell International Corporation, El Segundo, Calif.

[21] Appl. No.: 314,611

[22] Filed: Oct. 26, 1981

[51] Int. Cl.³ .................. C22B 34/22; C01G 31/00; C01G 31/02
[52] U.S. Cl. ................................ 423/65; 423/66; 423/67; 423/62; 423/DIG. 12
[58] Field of Search ............... 423/DIG. 12, 62, 65, 423/66, 67

[56] References Cited

U.S. PATENT DOCUMENTS

| | | | |
|---|---|---|---|
| 2,383,972 | 9/1945 | Jones | 23/22 |
| 2,990,365 | 5/1958 | Bieber et al. | 208/253 |
| 3,708,270 | 10/1970 | Birk et al. | 48/202 |
| 3,899,322 | 8/1975 | Yosim et al. | 75/65 |
| 3,916,617 | 11/1975 | McKenzie et al. | 60/39.02 |
| 3,936,371 | 2/1976 | Ueda et al. | 208/251 |
| 4,003,823 | 1/1976 | Baird, Jr. et al. | 208/108 |
| 4,100,107 | 7/1978 | Wolk et al. | 423/DIG. 12 |
| 4,119,528 | 10/1978 | Baird, Jr. et al. | 208/108 |
| 4,164,416 | 8/1979 | Gehri | 75/72 |
| 4,243,639 | 1/1981 | Haas et al. | 423/65 |

FOREIGN PATENT DOCUMENTS

| | | | |
|---|---|---|---|
| 680413 | 10/1952 | United Kingdom | 423/67 |
| 1062099 | 3/1967 | United Kingdom | 423/67 |

OTHER PUBLICATIONS

Weast et al., Handbook of Chemistry and Physics, 6th edition, The Chemical Rubber Co., pp. B-226.

Primary Examiner—Edward J. Meros
Assistant Examiner—Chung K. Pak
Attorney, Agent, or Firm—Henry Kolin; Michael A. Kondzella; H. Fredrick Hamann

[57] ABSTRACT

A carbonaceous material containing vanadium is reacted with an oxidizing gas in a molten salt pool containing an alkali metal carbonate. Vanadium values present in the carbonaceous material are converted to water-soluble vanadium compounds which are recovered from the melt and reacted with a strong acid to precipitate the vanadium values as insoluble vanadates. The vanadates are recovered as product or optionally further converted to vanadium pentoxide.

19 Claims, 3 Drawing Figures

FIG. 2

RECOVERY OF VANADIUM FROM CARBONACEOUS MATERIALS

BACKGROUND OF THE INVENTION

1. Field of the Invention

This invention relates to a process for the recovery of vanadium from carbonaceous materials. In one of its more particular aspects, this invention relates to using a molten salt treatment for recovering vanadium values from carbonaceous materials derived from petroleum.

2. Prior Art

Vanadium is the most abundant trace metal present in petroleum, occurring in crude petroleum in the range of about 0.001% by weight to about 0.15% or more depending upon the source of petroleum. The petroleum containing the highest concentrations of vanadium occurs in Venezuela. Some processed Venezuelan petroleum residues, such as coke, for example, have been found to have a vanadium concentration of as high as about 5% by weight. Because of the economic value of vanadium, attempts have been made in the past to recover the vanadium present in petroleum.

U.S. Pat. No. 2,383,972 discloses a process for recovering vanadium from petroleum during the course of a cracking operation which comprises reacting the metallic constituents of petroleum oil, including vanadium, with a solid hydrated sodium aluminum silicate of the zeolite type. Vanadium is recovered from the zeolite by means of solvent treating the zeolite with a strong mineral acid, precipitating the vanadium as ammonium vanadate by evaporating the acid solution with an excess of ammonium chloride, roasting the ammonium vanadate to produce the oxide, and reducing the oxide in an electric furnace.

Removal of traces of vanadium and other metals has also been of interest in processing hydrocarbon feedstocks. U.S. Pat. No. 2,990,365 discloses a process for demetallizing hydrocarbon oils by modifying the properties of complex organometallic compounds, including vanadium organometallics occurring in the oils, by contacting the hydrocarbon oils in the liquid phase with a fused alkali metal hydroxide. The organometallic compounds present are thereby converted to alkali metal salts which have greater water solubility and can be more easily removed from the hydrocarbon oils than the organometallic compounds.

U.S. Pat. No. 3,936,371 discloses a process for the removal of metal contaminants from heavy hydrocarbon oils by means of treatment with "red mud," a residue which occurs when bauxite is dissolved at high temperatures to produce alumina as a raw material for the electrolytic production of aluminum. Contacting the hydrocarbon oil with the "red mud" at temperatures in the range of about 350° to 500° C. in the presence of hydrogen at a pressure of about 1 to 300 atmospheres is said to be highly effective in removing the vanadium and other contaminants from the hydrocarbon oil.

U.S. Pat. No. 4,003,823 discloses a process for simultaneously desulfurizing and demetallizing heavy hydrocarbon feedstocks by a hydroconversion process utilizing an alkali metal hydroxide and hydrogen at a pressure of about 500 to 5000 psig and a temperature in the range of about 500° to 2000° F. (260° to 1093° C.).

U.S. Pat. No. 4,119,528 discloses a process in which simultaneous desulfurization, demetallization, and hydroconversion of heavy carbonaceous feeds is accomplished by treatment with potassium sulfide and hydrogen. The process is carried out at a temperature in the range of about 500° to 2000° F. (260° to 1093° C.) and a hydrogen pressure of about 500 to 5000 psig.

These prior art processes are generally designed to remove metallic impurities from hydrocarbonaceous feedstocks and do not result in rendering vanadium values readily recoverable from such processed feedstocks.

Recently, the use of molten salts for processing carbonaceous materials and for conducting a variety of chemical reactions has been suggested. U.S. Pat. No. 3,708,270 discloses a process in which carbonaceous materials are pyrolyzed by contact with a hot sulfate- or sulfide-containing melt under nonoxidizing conditions to produce valuable effluent combustible gases and char.

In U.S. Pat. No. 3,916,617, there is disclosed a process for gasification of a carbonaceous material to produce a combustible gas containing a high proportion of carbon monoxide to carbon dioxide. The resulting low Btu gas can be used as an energy source for conventional boilers, for example.

U.S. Pat. No. 3,899,322 discloses a process for recovering valuable metals from scrap containing metal values by means of a molten salt treatment using an alkali metal carbonate and optionally an alkali metal sulfate. A molten salt pool is maintained at a temperature in the range of about 400° to 1800° C. Excess air is passed into the pool, and the molten metal is removed from below the molten salt pool. The process is said to be particularly useful for recovering noble-type metals such as copper, silver, gold, palladium, and platinum, and also aluminum, from scrap containing such metal values.

In U.S. Pat. No. 4,164,416, there is disclosed a process for recovering metallic copper or lead from a sulfide ore containing the same by reacting the sulfide ore with a carbonaceous material and gaseous oxygen in a molten alkali metal carbonate pool. Temperatures in the range of about 600° to 1350° C. are utilized to cause reduction of the metal sulfide to metallic copper or lead.

None of the foregoing processes, however, can be used to recover vanadium values from carbonaceous materials.

OBJECTS OF THE INVENTION

It is an object of the present invention to recover at least 90% of the vanadium present in carbonaceous materials. It is another object of this invention to provide a process for recovering vanadium values from various petroleum feedstocks by converting the vanadium compounds present in such petroleum feedstocks to readily recoverable vanadates. It is another object of the present invention to recover the vanadium values present in a petroleum residue utilizing a gasification process. It is yet another object of this invention to provide such a process which requires a minimum number of processing steps. Other objects and advantages of this invention will become apparent in the course of the following detailed description.

SUMMARY OF THE INVENTION

In accordance with the broad aspects of the present invention, a carbonaceous material containing vanadium is treated with an oxygen-containing gas in a molten salt pool comprising an alkali metal carbonate. During the course of the gasification of the carbonaceous material, the vanadium values present are converted to water soluble vanadium compounds, such as alkali metal metavanadates. The water soluble vanadium compounds are reacted with a strong acid, such as sulfuric acid, to form insoluble alkali metal vanadates which, if desired, can be further converted to vanadium pentoxide, $V_2O_5$, the commercially available form of vanadium, sometimes known as "black cake."

The invention will be more clearly understood by reference to the detailed description of certain preferred embodiments which follows, taken in connection with the accompanying drawings.

DESCRIPTION OF THE PREFERRED EMBODIMENTS

The process of the present invention can be used to recover vanadium values from a wide variety of carbonaceous materials. In general, it is preferred to use as feedstocks petroleum residues, that is, materials from which at least some of the lower boiling petroleum fractions have been removed. In this respect, a preferred starting material is petroleum coke, such as fluidized coke, delayed coke, or Flexicoker coke. Other petroleum residues, such as asphalt and heavy petroleum oils, can be used similarly. Tar sands coke or other carbonaceous materials containing vanadium can also be used, if desired. It should, of course, be appreciated that the more concentrated the vanadium is in the feedstock, the more economical will be the recovery of vanadium values from such feedstock. In general, concentrations of vanadium in the range of about 0.001% to 5% are known to occur in various kinds of crude petroleum and petroleum residues. In particular, Venezuelan residues contain a relatively high percentage of vanadium which is recoverable by the process of the present invention. For example, a Venezuelan petroleum containing 0.013% by weight of vanadium may be found to contain 0.06% vanadium in a residual oil and 0.4% vanadium in fluid coke made from the residual oil.

Vanadium occurs in petroleum and other carbonaceous materials in various forms. The most common form present in petroleum is vanadium porphyrin. It is also known that vanadium occurs in petroleum in non-porphyrinic forms. However, little is known of the structure of the vanadium compounds, other than vanadium porphyrins, in which vanadium naturally occurs in crude petroleum. Regardless of the form in which vanadium occurs in the carbonaceous materials which are used as feedstocks for the process of the present invention, treatment of such feedstocks in the molten salt pool of a molten salt gasification plant has been found to convert the vanadium values present to soluble vanadium compounds. For example, where molten sodium carbonate is utilized as a principle component of the molten salt pool, the vanadium is converted to sodium metavanadate, $NaVO_3$.

It is a unique feature of the present invention that the vanadium values present in a carbonaceous feedstock can be isolated and recovered in such a molten salt plant during gasification of such feedstock to produce low or medium Btu heating fuels. This is accomplished by continuously withdrawing a stream from the molten salt pool, recovering the vanadium values from such stream, and regenerating and recycling the spent salts withdrawn from the molten salt pool. Vanadium recovery is thus achieved simultaneously with the production of such heating fuels.

Figure 1:
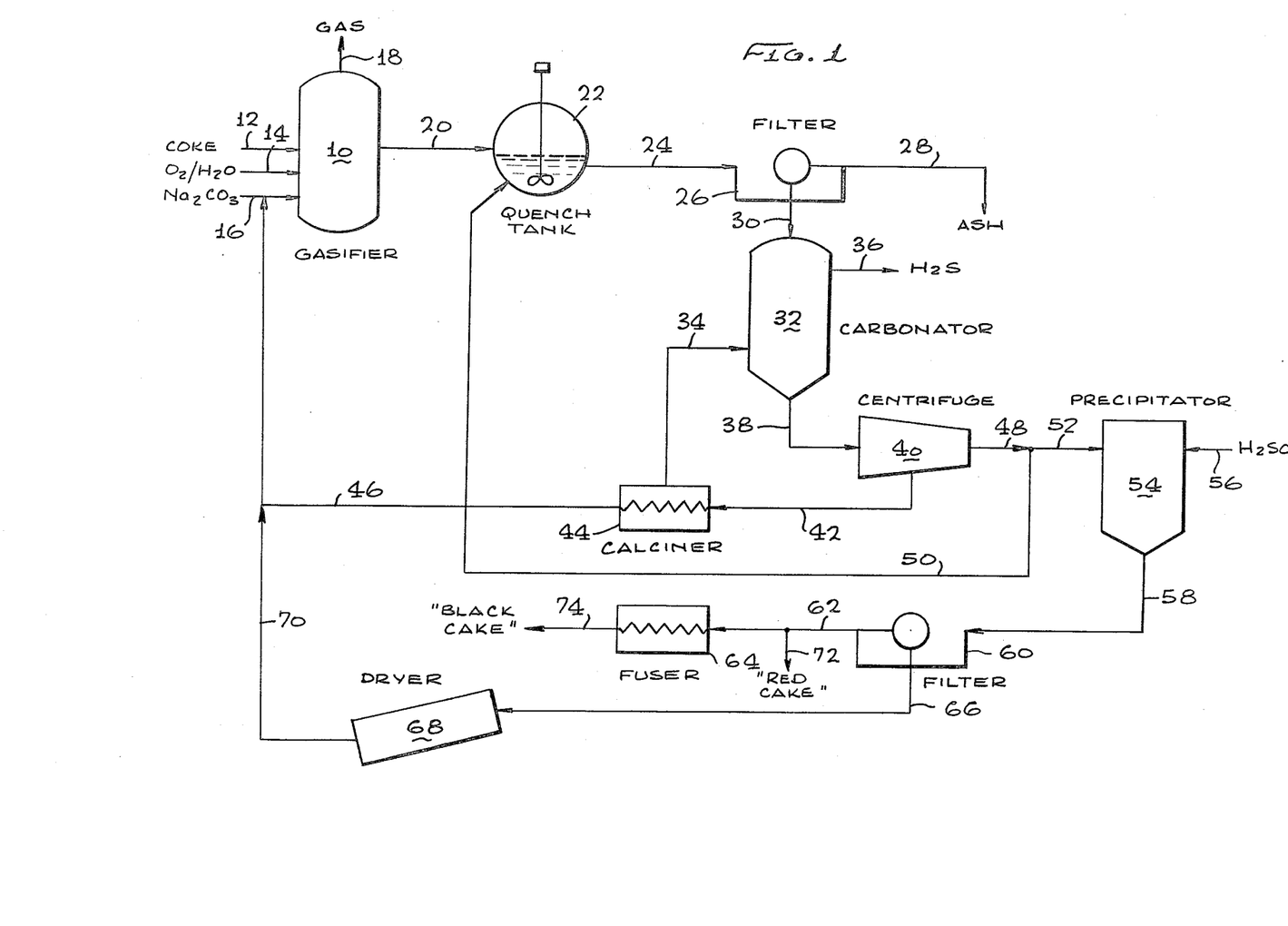
FIG. 1 is a schematic flow chart illustrating a preferred embodiment of the present invention.

Reference will now be had to FIG. 1 of the drawings in order to set forth in greater detail the utilization of a molten salt gasification plant in recovering vanadium values from petroleum and other carbonaceous feedstocks and to better appreciate the advantages of the present invention. In FIG. 1, a gasifier 10 contains a molten pool of an alkali metal carbonate and may additionally contain alkali metal sulfates, sulfides, or other salts. The sulfate, sulfide, or other salt, if present, decreases the temperature necessary to provide the requisite molten salt pool by lowering the melting point of the mixture of salts constituting the pool. The alkali metal carbonate may be, for example, sodium carbonate; or it may be a mixture of alkali metal carbonates such as a ternary mixture of lithium carbonate, sodium carbonate, and potassium carbonate, consisting of about 43.5 mole % lithium carbonate, 31.5 mole % sodium carbonate, and 25.0 mole % potassium carbonate, which forms a eutectic having a melting point of about 397° C. If an alkali metal sulfate, sulfide, or other salt is used in addition to the carbonate, it may be present initially in a concentration of about 1% to 25% by weight of the mixture of salts used to form the molten salt pool.

In the following description, the composition of the molten salt pool will, for the sake of convenience, be exemplified as sodium carbonate, $Na_2CO_3$. The feedstock exemplified will be petroleum coke. Temperatures in the range of about 700° to 1000° C., and preferably about 800° to 950° C., are maintained in the molten salt pool by controlling the rate at which an oxygen-containing gas is fed to the gasifier 10. Superatmospheric pressures in the range of about 2 to 50 atmospheres, and preferably about 5 to 30 atmospheres, are maintained in gasifier 10. Coke is introduced into gasifier 10 below the surface of the melt by means of a conduit 12. The oxygen-containing gas is similarly introduced via a conduit 14, and sodium carbonate is introduced via a conduit 16. Air, enriched air, or oxygen is most commonly used as the oxygen-containing gas. If oxygen or enriched air is used, steam is preferably mixed with the oxygen to moderate the temperature and provide a thermal balance for the system. The oxygen-containing gas is exemplified herein as a mixture of oxygen and steam, $O_2/H_2O$.

The operation of gasifier 10 is described with some degree of particularity in U.S. Pat. No. 3,916,617, the disclosure of which is hereby incorporated by reference. In the gasification step of the process of this invention, treatment of the feedstock in gasifier 10 results in the production of a low or medium Btu gas which is removed from gasifier 10 through a conduit 18 to be utilized in a conventional steam boiler, gas turbine, or other heating means. Where the oxygen-containing gas is air, a low Btu gas is produced, since the oxygen in the effluent from the gasifier 10 is diluted with nitrogen. Where oxygen is used, as exemplified herein, a medium Btu gas is produced. Vanadium present in the feedstock is converted to soluble vanadium compounds, here exemplified as sodium metavanadate. Sulfates are converted to sulfides in the gasifier 10.

A small stream of melt is continuously removed from the gasifier and replaced by the addition of dry sodium carbonate preferably mixed with the coke in order to prevent excessive build-up of ash and sodium sulfide, which are produced in the gasification reaction. The ash concentration is normally controlling when coal is gasified; but for high-sulfur petroleum coke, the sodium sulfide concentration controls, and the sodium carbonate recycle rate is adjusted to maintain a steady-state sodium sulfide concentration of about 5% to 60% by weight and preferably about 35% to 40% in the gasifier melt pool. Melt is removed from the gasifier, by a simple overflow arrangement, through a conduit 20 to a quench tank 22, which contains an aqueous quench liquor at a much lower temperature than that of the melt. For example, quench tank 22 may be operated at a temperature in the range of about 100° to 300° C., preferably about 150° to 200° C. The quench liquor may consist of water or preferably may consist of salt solutions, produced in later steps in the process of this invention, which are recirculated to make up the quench liquor.

The quenched melt is then conducted from quench tank 22 through a conduit 24 to a filter 26 wherein any ash which may be present is separated. Ash is removed through a conduit 28, and the filtrate is fed via a conduit 30 to a carbonator 32.

Carbonator 32 serves several purposes. Any sodium silicate, derived from silicates present in the feedstock, which is present in the filtrate is converted to silica, sodium bicarbonate and sodium carbonate by reaction with carbon dioxide, as illustrated in Equations 1 and 2.

$$Na_2SiO_3 + 2CO_2 + H_2O \rightarrow SiO_2 + 2NaHCO_3 \quad (1)$$

$$Na_2SiO_3 + CO_2 \rightarrow SiO_2 + Na_2CO_3 \quad (2)$$

Sodium sulfide produced in the gasification reaction is converted to sodium bicarbonate, sodium carbonate and hydrogen sulfide as illustrated in Equations 3 and 4.

$$Na_2S + 2CO_2 + 2H_2O \rightarrow 2NaHCO_3 + H_2S \quad (3)$$

$$Na_2S + CO_2 + H_2O \rightarrow Na_2CO_3 + H_2S \quad (4)$$

Sodium bicarbonate is also produced by carbonation of sodium carbonate as illustrated in Equation 5.

$$Na_2CO_3 + CO_2 + H_2O \rightarrow 2NaHCO_3 \quad (5)$$

The alkalinity of the solution fed to the carbonator is reduced from about pH 13.0 to pH 8.0. Carbon dioxide is fed to carbonator 32 from a calciner 44 via a conduit 34. Hydrogen sulfide is removed from carbonator 32 through a conduit 36 and may be conveyed to a processing plant for further utilization, such as to a Claus plant for the recovery of elemental sulfur.

A slurry containing the precipitated sodium bicarbonate and various soluble materials including the vanadium values, which have been converted to sodium metavanadate in gasifier 10, is removed from carbonator 32 via a conduit 38 and fed to a centrifuge 40. The solids separated in centrifuge 40, principally precipitated sodium bicarbonate, are removed via a conduit 42 and fed to calciner 44, in which the sodium bicarbonate is converted to solid sodium carbonate as illustrated in Equation 6. The sodium carbonate is recycled to gasifier 10 through conduits 46 and 16.

$$2NaHCO_3 \xrightarrow{\Delta} Na_2CO_3 + CO_2 + H_2O \quad (6)$$

Carbon dioxide formed in the reaction in calciner 44 is fed to carbonator 32 via conduit 34.

The supernatant liquor from centrifuge 40, containing the vanadium values in the form of sodium metavanadate in solution, is drained and the liquid stream removed through a conduit 48. The stream from conduit 48 divides, a part of the stream being recycled to quench tank 22 through a conduit 50, with the remaining portion being fed through a conduit 52 to a precipitator 54. Depending upon the vanadium concentration, about 10% to nearly 100% of the stream from centrifuge 40 may be processed for vanadium recovery. A strong acid, here exemplified as sulfuric acid, is fed to precipitator 54 through a conduit 56. Precipitator 54 is operated at elevated temperatures, usually at temperatures above the boiling point of the sulfuric acid solution and preferably at a temperature in the range of about 75° to 125° C. Sulfuric acid of about 15% to 98% concentration, and preferably about 35% to 50%, is used for the acid feed to the precipitator. Waste acids from vanadium demetallizing plants may furnish a suitable feed for the precipitator and may provide an additional source of vanadium. Other acids may be used if desired. Insoluble "red cake," a product sometimes characterized as sodium hexavanadate, $Na_4V_6O_{17}$ and sometimes characterized as sodium dihydrogen hexavanadate, $Na_2H_2V_6O_{17}$, is precipitated from an acid solution of about pH 1.0 to pH 3.5, preferably about pH 2.0 to pH 2.8. The formation of "red cake" is illustrated in Equations 7 and 8.

$$6NaVO_3 + H_2SO_4 \rightarrow Na_4V_6O_{17} + Na_2SO_4 + H_2O \quad (7)$$

$$6NaVO_3 + 2H_2SO_4 \rightarrow Na_2H_2V_6O_{17} + 2Na_2SO_4 + H_2O \quad (8)$$

A slurry containing the insoluble "red cake" from precipitator 54 is removed through a conduit 58 to a filter 60. Following filtration of the slurry in filter 60, the "red cake" is fed via a conduit 62 to a "red cake" fuser 64. The filtrate containing sodium sulfate is removed via a conduit 66 to a dryer 68 and recycled via conduits 70, 46, and 16 to gasifier 10 where it is used as make-up salt for the molten salt pool in the gasifier. If desired, a portion of the "red cake" may be removed as a product via a conduit 72. In fuser 64, the "red cake" is converted to "black cake" by heating at a temperature in the range of about 700° to 1000° C., and preferably about 800° to 900° C. The conversion of "red cake" to "black cake" is illustrated in Equations 9 and 10.

$$Na_4V_6O_{17} \xrightarrow{\Delta} 3V_2O_5 + 2Na_2O \quad (9)$$

$$Na_2H_2V_6O_{17} \xrightarrow{\Delta} 3V_2O_5 + Na_2O + H_2O \quad (10)$$

The "black cake" is removed to storage through a conduit 74. "Black cake," a commercially available vanadium pentoxide concentrate, contains about 86% to 90% vanadium pentoxide and about 6% to 10% sodium oxide.

Figure 2:
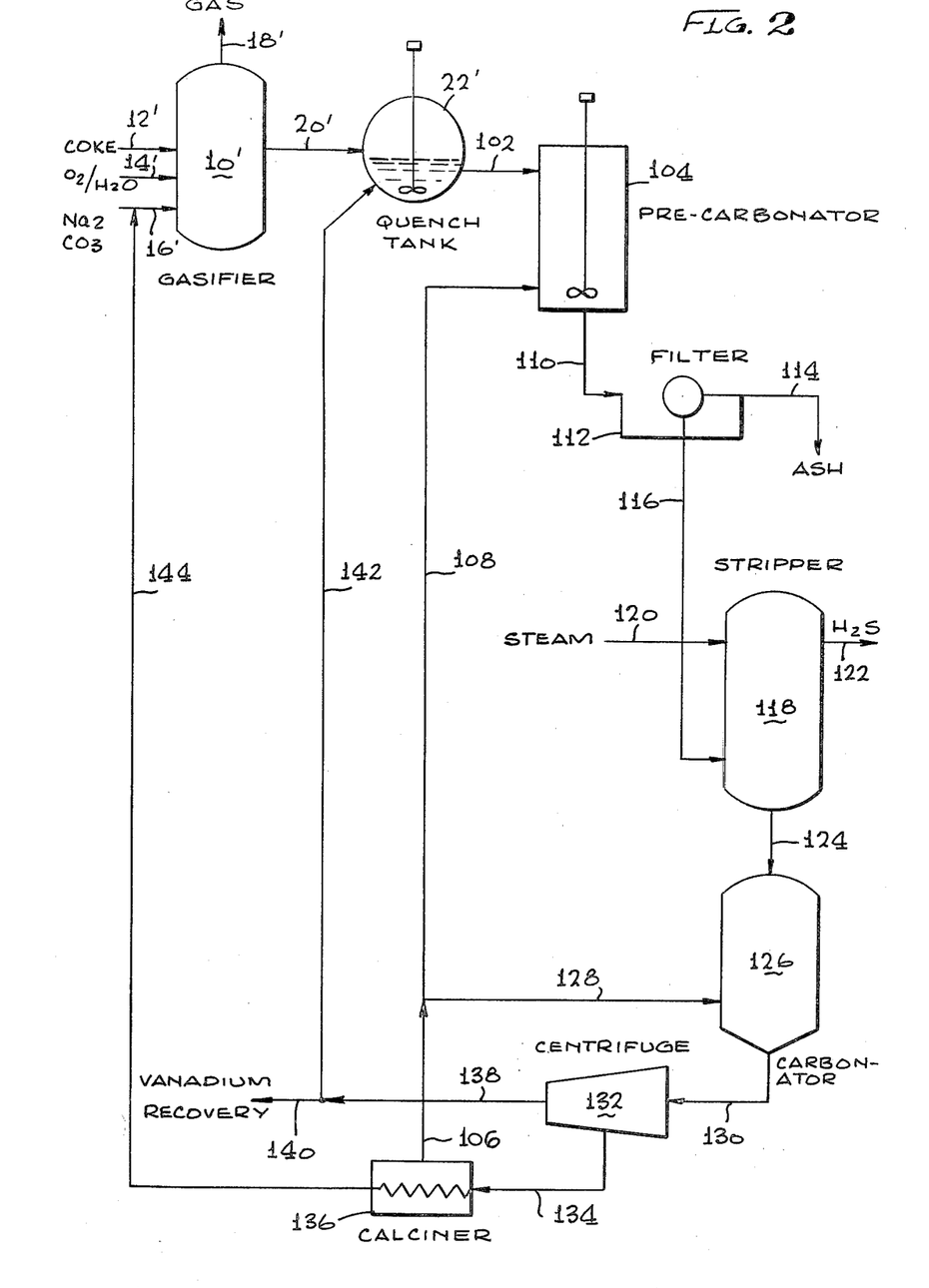
FIG. 2 is a schematic flow chart illustrating another embodiment of the invention in which the carbonate regeneration stage includes additional process steps for more effective removal of silicates, carbonates, and bicarbonates.

In the embodiment of the present invention illustrated in FIG. 2, wherein parts similar to those in FIG. 1 are designated by corresponding numerals, operation of gasifier 10' is as indicated above in the description of FIG. 1. Melt from gasifier 10' is removed via conduit 20' to quench tank 22'. The quenched melt is withdrawn via conduit 102 to a precarbonator 104. Carbon dioxide is introduced into precarbonator 104 via conduits 106 and 108 from a calciner 136. In precarbonator 104, sodium silicate is converted to silica, sodium bicarbonate, and sodium carbonate by reaction with carbon dioxide as illustrated in Equations 1 and 2; sodium sulfide is converted to sodium bicarbonate, sodium carbonate and hydrogen sulfide as illustrated in Equations 3 and 4; sodium carbonate is carbonated to produce sodium bicarbonate as illustrated in Equation 5; and the alkalinity of the solution is reduced from about pH 13.0 to a pH in the range of about pH 9.0 to pH 10.0 and preferably to about pH 9.5. The resulting slurry is removed from precarbonator 104 through a conduit 110 to a filter 112, wherein ash and silica are removed as waste via a conduit 114. The filtrate is conducted via a conduit 116 to a stripper 118. In stripper 118, hydrogen sulfide is stripped from the filtrate by means of steam introduced via a conduit 120. Hydrogen sulfide gas exits through a conduit 122 and may be further treated as previously explained. The filtrate from stripper 118 is fed via a conduit 124 to a carbonator 126 wherein carbon dioxide introduced via a conduit 128 causes the remaining sodium sulfide and sodium carbonate to be converted to sodium bicarbonate crystals and the alkalinity of the solution to be further reduced from about pH 9.5 to a pH in the range of about pH 8.0 to pH 8.2. The precipitated sodium bicarbonate, in the form of a slurry, is removed through a conduit 130 to a centrifuge 132. Solids are removed from centrifuge 132 via a conduit 134 to a calciner 136. The remaining liquids are drained from centrifuge 132 via a conduit 138. At this point, the liquid stream is divided, part of the stream passing via a conduit 140 to vanadium recovery stages as previously described with respect to FIG. 1, the remainder of the stream being fed via a conduit 142 to quench tank 22' and used as quench liquor therein. The solids fed from centrifuge 132 to calciner 136 are heated to a temperature in the range of about 250° to 750° C., and preferably about 400° to 650° C., and the carbon dioxide thereby released is removed from calciner 136 via conduit 106 and introduced to precarbonator 104 via conduit 108 and to carbonator 126 via conduit 128. The solids remaining in calciner 136 are conducted via conduits 144 and 16' to gasifier 10' wherein they are introduced below the surface of the melt and used as additional make-up to form the molten salt pool in gasifier 10'.

The embodiment shown in FIG. 2 has the advantages of reducing the quantity of solids which are required to be removed in the carbonation stage, of facilitating the separation of bicarbonate crystals in the carbonator, and of providing a relatively pure hydrogen sulfide product. By removing the hydrogen sulfide from the filtrate in a separate stage in stripper 118 by the use of steam prior to feeding it to the carbonator, the hydrogen sulfide is uncontaminated by carbon dioxide. Also, silicate removal is facilitated. This advantage is particularly important where the carbonaceous material being gasified is material containing a relatively high proportion of silicates.

Figure 3:
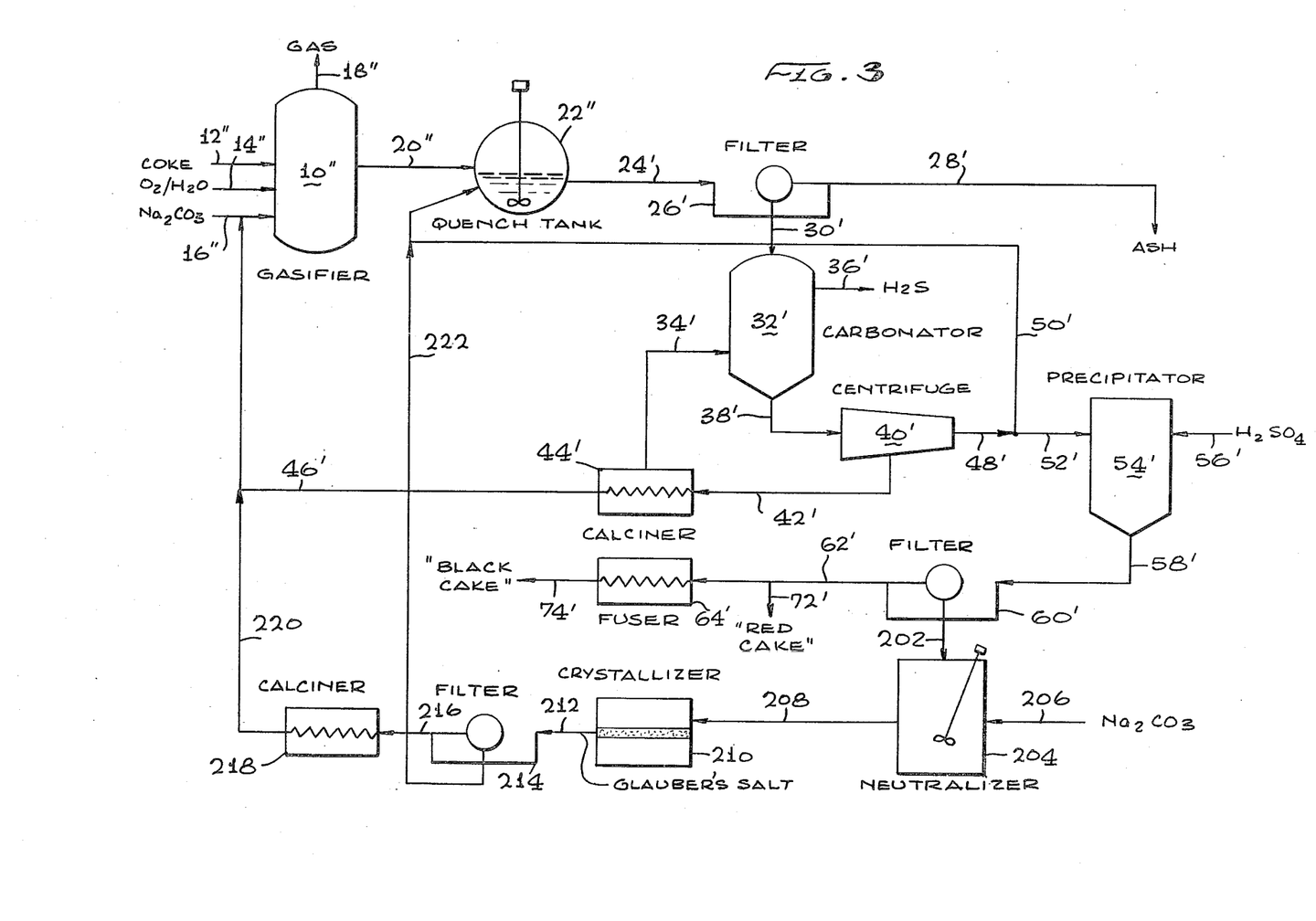
FIG. 3 is a schematic flow chart illustrating another embodiment of the invention in which the vanadium recovery stage includes additional process steps for crystallization of Glauber's salt from the filtrate resulting from the precipitation of vanadates.

In the embodiment illustrated in FIG. 3, wherein parts similar to those in FIG. 1 or FIG. 2 are designated by corresponding numerals, provision is made for recycling sulfates as well as for recovering vanadium values. Following precipitation of "red cake" in precipitator 54' and filtration thereof in filter 60', the filtrate is fed from filter 60' via a conduit 202 to a neutralizer 204, wherein an alkali metal base is used to neutralize excess sulfuric acid. Sodium carbonate, for example, is introduced into neutralizer 204 through a conduit 206. The excess sulfuric acid is thereby neutralized as illustrated in Equation 11.

$$H_2SO_4 + Na_2CO_3 \rightarrow Na_2SO_4 + CO_2 + H_2O \qquad (11)$$

The neutralized filtrate containing sodium sulfate is fed via a conduit 208 to a crystallizer 210 which is cooled to a temperature in the range of about 15° to −5° C., and preferably about 0° to −2° C. In crystallizer 210, part of the sodium sulfate crystallizes out as Glauber's salt, sodium sulfate decahydrate, $Na_2SO_4 \cdot 10H_2O$. The resulting slurry is removed from crystallizer 210 through a conduit 212 to filter 214, where the precipitated Glauber's salt is removed via conduit 216 to calciner 218, converted to anhydrous sodium sulfate and recycled to gasifier 10'' via conduits 220, 46' and 16'', where it is used as make-up salt for the molten salt pool in the gasifier. The filtrate is recycled via conduit 222 to quench tank 22''.

The embodiment of FIG. 3 is advantageous in that the sulfate produced in the precipitation of vanadium "red cake" is eventually recycled to the molten salt make-up of gasifier 10'', thereby utilizing not only the acidity of the sulfuric acid used in the precipitation but also the sulfate content thereof.

The following example is intended to illustrate the process of the present invention but is not to be considered a limitation thereof.

EXAMPLE

A quantity of 0.900 lb sodium carbonate and 0.183 lb sodium sulfate was charged to a cold alumina tube, 1¾ in. ID by 2 in. OD by 18 in. high, disposed in a 2½ in. diameter by 20 in. high electric furnace, the temperature of which was controlled by a saturable controller. The temperature of the tube was raised to 950° C. over a 2-hour period. Then, 0.044 lb of petroleum coke was mixed into the molten salt bed in order to reduce the sodium sulfate to sodium sulfide. The bed was sparged with reducing gas containing 21% by volume of carbon monoxide, 12% hydrogen, and 67% nitrogen, at a rate of 3.25 liters per minute, corresponding to a superficial gas velocity of 0.5 fps, in order to exclude air and to simulate the steady state gas condition within the gasifier during operation, wherein, as pointed out above, a low Btu gas is produced by the use of air as the oxidizing gas fed to the gasifier. The coke was added gradually over a 15-minute period by pouring through a funnel. An additional 15 minutes were allowed for completion of the sulfate reduction. Then, over a 10-minute period, 0.1 lb vanadium pentoxide was added to the bed through the funnel. About 200 cc per minute of gas was used to stir the salt bed during this period. When all of the $V_2O_5$ had been charged, the reducing gas was sparged through the molten salt for 2 hours while holding the salt temperature at 900° C. After the 2-hour sparge period, the melt was poured into a stainless steel pan blanketed with nitrogen gas. A portion of the melt was dissolved in water and filtered, and filtrate and residue were analyzed for vanadium. It was found that 98.9 wt % of the vanadium charged to the melt was present in the filtrate as sodium metavanadate.

A 100-gram sample of melt was dissolved in 500 grams water. The mixture was agitated on a hot plate, boiled for 10 minutes, and then suction filtered through a porous stainless steel filter. The dried residue was found to weigh 3.10 grams. The filtrate weighed 618.66 grams. A 200-gram portion of the filtrate was titrated with 15 wt % sulfuric acid at a temperature of 92° C. from pH 12.0 to pH 2.5 over a period of 20 minutes, and the solution was held at approximately the boiling temperature, 100° C., for 1 hour. The red precipitate which formed was filtered and dried at 125° C. A quantity of 3.55 grams of precipitate formed was filtered and dried at 125° C. A quantity of 3.55 grams of precipitate was collected. Analysis showed that 95.5% of the vanadium was present in the precipitate.

Thus it can be seen that the present invention provides a process by which it is possible to recover at least 90% of the vanadium values present in carbonaceous feedstocks, at the same time producing useful products including a combustible gas and recovering substantially all of the sodium carbonate or other salt used in the gasification process.

It will, of course, be realized that various modifications can be made in the design and operation of the present invention without departing from the spirit thereof. For example, the improved carbonate regeneration stage of FIG. 2 can be combined with the improved vanadium recovery stage of FIG. 3 to provide a process combining the advantages of both improvements. Thus, while the principle, preferred construction, and mode of operation of the invention have been explained and what is now considered to represent its best embodiment has been illustrated and described, it should be understood that within the scope of the appended claims, the invention can be practiced otherwise than as specifically illustrated and described.

What is claimed is:

1. A process for recovering vanadium values from a carbonaceous material containing vanadium which comprises:

treating said carbonaceous material with an oxygen-containing gas in a molten salt comprising an alkali metal carbonate to convert the vanadium present in said carbonaceous material into water-soluble vanadium compounds;

quenching at least a part of the melt containing said water-soluble vanadium compounds in an aqueous solution;

removing ash from the resulting quenched melt solution;

reacting the de-ashed quenched melt solution with carbon dioxide to produce alkali metal bicarbonates and hydrogen sulfide gas and to lower the alkalinity of said solution from about pH 13.0 to a pH in the range of about pH 8.0 to pH 9.5;

separating precipitated alkali metal bicarbonates from a solution containing alkali metal bicarbonates, alkali metal carbonates and water-soluble vanadium compounds;

heating the separated precipitated alkali metal bicarbonates to release carbon dioxide therefrom and to form alkali metal carbonates;

recycling the thus formed alkali metal carbonates to said molten salt;

treating said solution containing unprecipitated alkali metal bicarbonates, alkali metal carbonates and water-soluble vanadium compounds with sulfuric acid at a temperature in the range of about 75°–125° C. and a pH in the range of about pH 1.0 to pH 3.5 to form insoluble alkali metal vanadates and soluble alkali metal sulfates;

recovering said alkali metal vanadates; and recycling said alkali metal sulfates to provide at least a part of said molten salt.

2. A process according to claim 1 wherein any unreacted sulfuric acid is neutralized by reaction with an alkali metal base to form additional alkali metal sulfate, and said alkali metal sulfates are crystallized and recycled to provide at least a part of said molten salt.

3. A process according to claim 2 wherein said alkali metal carbonate is sodium carbonate, said alkali metal sulfate is sodium sulfate, the crystallization of sodium sulfate results in the formation of Glauber's salt, $Na_2SO_4 \cdot 10H_2O$, said Glauber's salt is heated to convert it to anhydrous sodium sulfate, and said anhydrous sodium sulfate is recycled to provide at least a part of said molten salt.

4. A process according to claim 1 wherein said alkali metal vanadates, following recovery thereof, are converted to vanadium pentoxide.

5. A process according to claim 1 wherein said carbonaceous material comprises a petroleum residue.

6. A process according to claim 1 wherein said water-soluble vanadium compounds comprise sodium metavanadate.

7. A process according to claim 1 wherein the reaction of the water-soluble vanadium compounds with sulfuric acid is conducted at a temperature in the range of about 75° to 125° C.

8. A process according to claim 1 wherein said insoluble alkali metal vanadates comprise vanadium "red cake."

9. A continuous process for simultaneously producing a combustible gas and recovering vanadium values from a carbonaceous material containing vanadium which comprises:

(1) introducing said carbonaceous material and an oxygen-containing gas into a melt comprising an alkali metal carbonate at a temperature in the range of about 700° to 1100° C., to produce a combustible gas and to convert the vanadium present in said carbonaceous material to water-soluble vanadium compounds;

(2) quenching at least a part of the melt containing said soluble vanadium compounds in an aqueous solution;

(3) removing ash from the resulting quenched melt solution;

(4) reacting the de-ashed quenched melt solution with carbon dioxide to produce alkali metal bicarbonates and hydrogen sulfide gas and to lower the alkalinity of said solution from about pH 13.0 to a pH in the range of about pH 8.0 to pH 9.5;

(5) separating precipitated alkali metal bicarbonates from unprecipitated alkali metal bicarbonates, alkali metal carbonates and water-soluble vanadium compounds;

(6) heating said precipitated alkali metal bicarbonates to release therefrom carbon dioxide and to form alkali metal carbonates;

(7) recycling the thus-formed alkali metal carbonates to said melt;

(8) removing a stream containing the unprecipitated alkali metal bicarbonates, alkali metal carbonates and soluble vanadium compounds from step (5);

(9) recycling a portion of the stream containing such compounds to said aqueous solution; and (10) treating another portion of said stream with sulfuric acid at a temperature in the range of about 75° to 125° C. and a pH in the range of about pH 1.0 to pH 3.5 to precipitate the vanadium values as insoluble alkali metal vanadates and to produce soluble alkali metal sulfates, said alkali metal sulfates being recycled to said melt.

10. A process according to claim 9 wherein said alkali metal vanadates, following recovery thereof, are fused at a temperature in the range of about 800° to 900° C. to produce vanadium pentoxide.

11. A process according to claim 9 wherein said quenched melt from step (2) is treated with carbon dioxide prior to removing the ash to provide a pH in the range of about pH 9.5 to pH 10.0 and to convert a substantial proportion of the silicates present in the quenched melt to silica, said silica is removed along with the ash in step (3), said hydrogen sulfide is stripped from the filtrate, and said stripped filtrate is again treated with carbon dioxide to provide a pH in the range of about pH 8.0 to pH 8.2, whereby alkali metal bicarbonates are precipitated from a solution containing alkali metal carbonates, and a substantial portion of the silicates present in the quenched melt is converted to silica upon treatment with carbon dioxide and filtered from the resulting slurry in the ash removal step.

12. A process according to claim 9 wherein the solution containing soluble alkali metal sulfates from the alkali metal vanadate precipitation step is reacted with an alkali metal carbonate to neutralize any unreacted sulfuric acid, the neutralized solution is chilled to a temperature in the range of about 15° to −5° C. to crystallize alkali metal sulfates therefrom, and said crystallized alkali metal sulfates are dehydrated and recycled to said melt.

13. A process according to claim 12 wherein said alkali metal carbonate comprises sodium carbonate, said crystallized alkali metal sulfates contain Glauber's salt, $Na_2SO_4 \cdot 10H_2O$, and anhydrous sodium sulfate is recycled to said melt.

14. A process according to claim 9 wherein said alkali metal carbonate comprises a eutectic mixture of lithium carbonate, sodium carbonate, and potassium carbonate having a melting point of about 397° C.

15. A process according to claim 9 wherein said oxygen-containing gas is a member selected from the group consisting of air and a mixture of oxygen and steam.

16. A process according to claim 9 wherein said carbonaceous material comprises a petroleum residue.

17. A process for recovering vanadium values from a carbonaceous material containing vanadium which comprises:

treating said carbonaceous material with an oxygen-containing gas in a molten salt comprising an alkali metal carbonate to convert the vanadium present in said carbonaceous material into water-soluble vanadium compounds;

quenching at least a part of the melt containing said water-soluble vanadium compounds in an aqueous solution;

removing ash from the resulting quenched melt solution;

reacting the de-ashed quenched melt solution with carbon dioxide to produce alkali metal bicarbonates and hydrogen sulfide gas and to lower the alkalinity of said solution from about pH 13.0 to a pH in the range of about pH 8.0 to pH 9.5;

separating precipitated alkali metal bicarbonates from a solution containing alkali metal bicarbonates, alkali metal carbonates and water-soluble vanadium compounds;

heating the separated precipitated alkali metal bicarbonates to release carbon dioxide therefrom and to form alkali metal carbonates;

recycling the thus formed alkali metal carbonates to said molten salt;

treating said solution containing unprecipitated alkali metal bicarbonates, alkali metal carbonates and water-soluble vanadium compounds with sulfuric acid at a temperature in the range of about 75°–125° C. and a pH in the range of about pH 1.0 to pH 3.5 to precipitate the vanadium values as insoluble alkali metal vanadates; and recovering said alkali metal vanadates.

18. A process for recovering vanadium values from a carbonaceous material containing vanadium which comprises:

treating said carbonaceous material with an oxygen-containing gas in a molten salt comprising an alkali metal carbonate to convert the vanadium present in said carbonaceous material to water-soluble vanadium compounds;

quenching at least a part of the melt containing said water-soluble vanadium compounds in an aqueous solution;

treating said quenched melt solution with carbon dioxide to produce alkali metal bicarbonates and to convert a substantial proportion of the silicates present in the quenched melt to silica and to lower the alkalinity of said solution from about pH 13.0 to a pH in the range of about pH 9.5 to pH 10.0;

removing ash and silica from the resulting carbon dioxide-treated quenched melt solution;

stripping hydrogen sulfide from the de-ashed carbon dioxide-treated quenched melt solution;

treating the resulting stripped solution with carbon dioxide to provide a pH in the range of about pH 8.0 to pH 8.2 and to precipitate alkali metal bicarbonates;

separating precipitated alkali metal bicarbonates from a solution containing alkali metal bicarbonates, alkali metal carbonates and water-soluble vanadium compounds;

heating the separated precipitated alkali metal bicarbonates to release carbon dioxide therefrom and to form alkali metal carbonates;

recycling the thus formed alkali metal carbonates to said molten salt;

treating said solution containing unprecipitated metal bicarbonates, alkali metal carbonates and water-soluble vanadium compounds with sulfuric acid at a temperature in the range of about 75°–125° C. at a pH in the range of about pH 1.0 to pH 3.5 to precipitate the vanadium values as insoluble alkali metal vanadates; and recovering said alkali metal vanadates.

19. A process for recovering vanadium values from a carbonaceous material containing vanadium which comprises:

treating said carbonaceous material with an oxygen-containing gas in a molten salt comprising an alkali metal carbonate to convert the vanadium present in said carbonaceous material to water-soluble vanadium compounds;

quenching at least a part of the melt containing said water-soluble vanadium compounds in an aqueous solution;

treating said quenched melt solution with carbon dioxide to produce alkali metal bicarbonates and to convert a substantial proportion of the silicates present in the quenched melt to silica and to lower the alkalinity of said solution from about pH 13.0 to a pH in the range of about pH 9.5 to pH 10.0;

removing ash and silica from the resulting carbon dioxide-treated quenched melt solution;

stripping hydrogen sulfide from the de-ashed carbon dioxide-treated quenched melt solution;

treating the resulting stripped solution with carbon dioxide to provide a pH in the range of about pH 8.0 to pH 8.2 and to precipitate alkali metal bicarbonates;

separating precipitated alkali metal bicarbonates from a solution containing alkali metal bicarbonates, alkali metal carbonates and water-soluble vanadium compounds;

heating the separated precipitated alkali metal bicarbonates to release carbon-dioxide therefrom and to form alkali metal carbonates;

recycling the thus formed alkali metal carbonates to said molten salt;

treating said solution containing unprecipitated metal bicarbonates, alkali metal carbonates and water-soluble vanadium compounds with sulfuric acid at a temperature in the range of about 75°–125° C. at a pH in the range of about pH 1.0 to pH 3.5 to form insoluble alkali metal vanadates and soluble alkali metal sulfates;

recovering said alkali metal vanadates; and recycling said alkali metal sulfates to provide at least a part of said molten salt.

* * * * *